Oct. 13, 1931.  J. ROBINSON  1,826,954

AUTOMATIC TRAIN PIPE CONNECTER

Filed Oct. 27, 1927

INVENTOR
Joseph Robinson
BY
ATTORNEY

Patented Oct. 13, 1931

1,826,954

UNITED STATES PATENT OFFICE

JOSEPH ROBINSON, OF NEW YORK, N. Y.

AUTOMATIC TRAIN PIPE CONNECTER

Application filed October 27, 1927. Serial No. 229,235.

My invention relates to improvements in automatic train pipe connecters and has among its objects to provide an improved means for interchangeably connecting the train pipe of a car having the automatic connecter to the hose of a car not so equipped. The details of construction and the novel features of the invention are described in the following specification, pointed out in the appended claims and illustrated in the accompanying drawings, in which:

Figure 1:
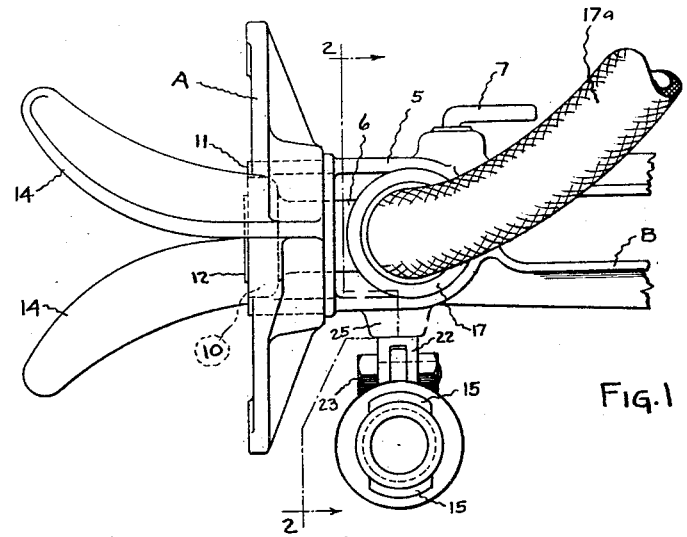
Figure 1 is a side elevation of the forward part of a well known type of automatic connecter, provided with my improvement.

Referring now to the drawings: My improvement may be used with any suitable form of coupling head and support. I preferably show a coupling head A of the well known wing type, and a support B to which the head is secured. The support is provided with a forward hollow end 5 onto which the head A is pressed as shown. Within this hollow forward end a curved or laterally extending conduit 6 is mounted and secured in place as by a spring actuated pin 7, the fitting 6 being provided on its rear side with a lug 8, Figure 2, which normally rests on a support 9, Figure 3, to maintain the fitting in the proper horizontal position. The pin serves, of course, to lock the fitting against accidental displacement or disconnection from the hollow forward end 5 of the support B. The conduit is provided with an enlarged forward end 10 which rests substantially in the plane of the forward face 11 of the support B, and carries a suitable gasket 12, the heads A being provided with any desired form of gathering means or prongs 14 to cause opposing gaskets 12 to align one with the other when the automatic connecter couples up in service. The rear end of the conduit 6 is provided with laterally extending lugs or dogs 15 adapted to interlockingly receive complementary lugs or dogs 16 of a union member 17. Between the rear end 18 of the conduit 6 and the union 17, a suitable form of air expanded gasket 19 is inserted, the gasket being placed under slight initial compression when the union member 17 is assembled onto the conduit 6. This assembly and the disconnection of the member 17 from the conduit 6 is accomplished by rotating member 17 to the right or left one quarter turn. It is understood, of course, that the member 17 serves to detachably connect the suitable train pipe 17a to the conduit 6.

The foregoing parts and elements of my invention and their operation are very similar to corresponding parts illustrated and described in my copending application, Serial No. 490,340, reference to which is hereby made for a more detailed description of the construction and operation of these parts.

The novel features of my present invention over the construction disclosed in the above copending application, Serial No. 490,340, resides particularly in the manner in which my improved interchange device is attached to the support B. In the copending application mentioned the interchange is shown as rigidly secured to the support, and service has demonstrated certain objections to exist with this form of interchange, the objection being mainly difficulty in coupling the interchange to the hose of the unequipped car, and the localization of undue stresses in the interchange in parting cars without first disconnecting the interchange from the hose of the car not having the automatic connecter.

In my present invention these objections are eliminated by swivelly mounting the interchange on the support B. To this end my improved interchange device C consists of a shank 20 of any desired material, preferably metal, suitably connected to a standard form of hand operated hose coupling head D, such as the Westinghouse type. The shank 20 is provided with a vertically extending lug or boss 21 which fits between the fork of a clevis-bolt or swivel 22, a bolt 23 passing through the clevis-bolt and the lug 21 to pivotally secure the shank 20 to the clevis-bolt. The clevis-bolt is provided with a stem 24 which projects upwardly through an opening in the boss 25 formed on the lower side of the enlarged forward end 5 of the support B. A suitable nut or retaining collar 26 is suitably connected as by threads to the upper end of the stem 24 to maintain the stem firmly supported in its bearing in the boss 25 and thus support the interchange device C from the under side of the support B, and firmly tie the same thereto. It will be understood, of course, that the stem 24 may rotate in the boss 25, and that the lug 21 may pivot between the forks of the clevis-bolt 22, which arrangement forms in effect a universal joint by which the interchange device C has universal movement relative to the support B.

Figure 2:
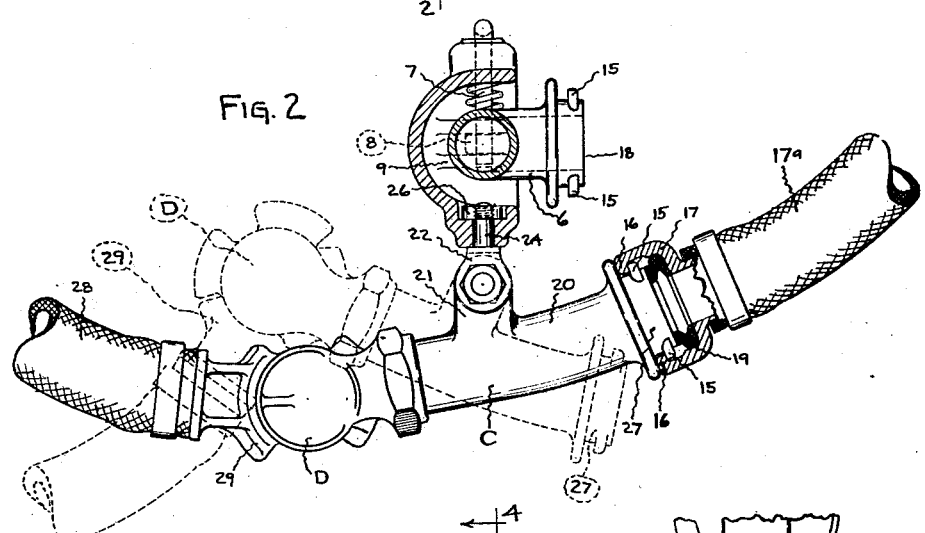
Figure 2 is a sectional elevation taken on approximately the line 2—2 of Figure 1 and showing my improved interchange in operation. In this view a part of the union 17 is shown in section.

When it is desired to effect interchange between a car not having my improved interchange device and one equipped with the automatic connecter, the coupling head D of my improved interchange device is rotated upwards about its pivotal connection with the clevis-bolt 22, to the position shown by dotted lines in Figure 2. The hose 28 of the car not having the automatic connecter, is then coupled into the head D of my improved interchange device by means of a coupling device 29 which is complementary to or interchangeable with the aforesaid coupling head D. By rotating the interchange device C from the position shown by the dotted lines in Figure 2, to the position shown by full lines in said figure, the coupling head D of the interchange device will interlock with the complementary coupling 29 and the parts will then occupy the normal service position shown. The train pipe 17a is then disconnected from the conduit 6 by rotating the member 17 and the hose one quarter turn to the right or left, and is coupled to the rear end 27 of the shank 20 by a similar rotation of the member and the hose. This operation efficiently connects the train pipe 17a into interchange communication with the hose 28 of a car not equipped with the automatic connecter. The reverse of these operations will disconnect the interchange and reconnect the train pipe 17a to the conduit 6.

Pressing downwardly upon the rear end of the shank 20 will, after the train pipe has been disconnected, rotate the interchange device C to the position shown by the dotted lines, Figure 2, and automatically disconnecting it from the hose 28. By means of this arrangement the trainman can connect the train pipe 17a into interchange communication with the hose 28 from one side of the connecter.

Figure 3:
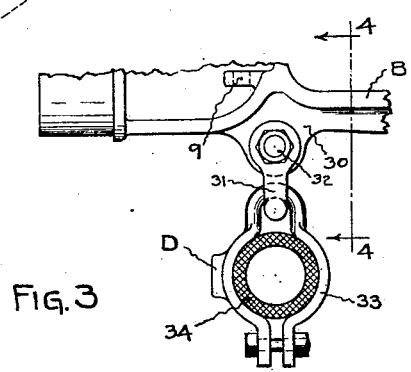
Figure 3 is a sectional elevation showing a modification of my improvement.
Figure 4:
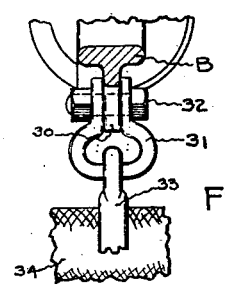
Figure 4 is a view taken on approximately the line 4—4 of Figure 3 further illustrating the modification.

The modification shown in Figure 3 consists of providing the pipe B with a perforated projection 30 spanned by a clevis 31 and secured thereto by a suitable bolt 32. A second clevis or clamp 33 is hooked under the clevis 31 and embraces a short rubber hose section 34 employed in lieu of the metal shank 20 shown in Figure 2. In other respects, and in operation, this modification is the same as that of the preferred construction described. It is understood, of course, that the connection between the clevis 31 and the web or projection 30 of the support B is a pivotal connection. The use of this modified form of my invention permits of the use of short sections of rubber hose reclaimed from hose scrapped by the railways, and permits also of the use of old hose coupling heads 29. The interchange being but a temporary or transient part of the connecter, it is permissible that these parts be made up of reclaimed material.

Having thus described the invention, what is claimed as new and desired to be secured by Letters Patent is:

1. In combination with a coupling head support and a train pipe hose, an interchange device comprising a tubular member, means for pivotally connecting said member to said support, said means including a horizontal pivot intermediate the ends of said member, whereby up and down movement of the ends of said member is permitted, means at one end of said member for detachably connecting a train pipe hose thereto, the other end of said member having an ordinary hand hose coupling attached thereto.

2. In combination with a coupling head support and a train pipe hose, an interchange device comprising a tubular member, means for pivotally connecting said member to said support, said means including a vertical pivot intermediate the ends of said member, whereby movement of the member in a horizontal plane is permitted, means at one end of said member for detachably connecting a train pipe hose thereto, the other end of said member having an ordinary hand hose coupling attached thereto.

3. In combination with a coupling head support and a train pipe hose, an interchange device comprising a tubular member arranged beneath said support, a universal joint connection between said support and said tubular member intermediate the ends of the latter, thereby permitting universal movement of the member relative to the support, means at one end of said member for detachably connecting a train pipe hose thereto, the other end of said member having an ordinary hand hose coupling attached thereto.

4. In combination with a coupling head support and a train pipe hose, an interchange device comprising a tubular member arranged beneath said support, a pivot member connected to said tubular member intermediate the ends thereof, said pivot member being rotatably connected to said support and rotatable relative thereto on a substantially vertical axis, said pivot member also being pivotally connected to said tubular member, the axis of said last mentionel pivotal connection being substantially horizontal, means at one end of said tubular member for detachably connecting a train pipe hose thereto, the other end of said member having an ordinary hand hose coupling attached thereto.

In testimony whereof I hereunto affix my signature.

JOSEPH ROBINSON.